US010511958B1

United States Patent
Chikkala et al.

(10) Patent No.: US 10,511,958 B1
(45) Date of Patent: Dec. 17, 2019

(54) INTELLIGENT PERSONALIZATION OF 5G TERMINALS FOR 5G AND PRE-5G SIM CARDS

(71) Applicant: QUALCOMM Incorporated, San Diego, CA (US)

(72) Inventors: Venkata Durga Vinod Chikkala, Hyderabad (IN); Naga Chandan Babu Gudivada, Hyderabad (IN); Nagarjuna Alavala, Prakasam district (IN); Phani Pradeep Kumar Kothapalli Venkata, Hyderabad (IN); Rajendra Prasad Nelurouth, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/159,464

(22) Filed: Oct. 12, 2018

(51) Int. Cl.
| | |
|---|---|
| *H04W 8/18* | (2009.01) |
| *H04L 9/06* | (2006.01) |
| *H04L 9/08* | (2006.01) |
| *H04W 88/06* | (2009.01) |
| *H04W 8/26* | (2009.01) |
| *H04W 12/06* | (2009.01) |

(52) U.S. Cl.
CPC ........... *H04W 8/183* (2013.01); *H04L 9/0643* (2013.01); *H04L 9/088* (2013.01); *H04W 8/26* (2013.01); *H04W 12/06* (2013.01); *H04W 88/06* (2013.01)

(58) Field of Classification Search
CPC ..... H04W 8/183; H04W 12/06; H04W 88/06; H04W 8/26; H04L 9/088; H04L 9/0643
See application file for complete search history.

(56) References Cited

U.S. PATENT DOCUMENTS

| | | | |
|---|---|---|---|
| 2006/0129848 A1* | 6/2006 | Paksoy | G06F 21/78 713/193 |
| 2012/0291091 A1* | 11/2012 | Laarakkers | H04W 12/12 726/1 |
| 2017/0019780 A1* | 1/2017 | Hsu | H04W 8/183 |
| 2018/0014178 A1 | 1/2018 | Baek et al. | |
| 2018/0160294 A1 | 6/2018 | Lee et al. | |
| 2018/0227871 A1* | 8/2018 | Singh | H04W 60/00 |
| 2018/0227872 A1 | 8/2018 | Li et al. | |
| 2018/0368039 A1* | 12/2018 | Wu | H04W 36/0033 |

FOREIGN PATENT DOCUMENTS

WO     2018140384 A1     8/2018

OTHER PUBLICATIONS

NEC: "Making 5G a Reality", Orchestrating a Brighter World, 2018, 32 Pages.

* cited by examiner

*Primary Examiner* — Joseph E Dean, Jr.
(74) *Attorney, Agent, or Firm* — Arent Fox, LLP

(57) ABSTRACT

The apparatus determines whether a subscriber identification module (SIM) card is a first network SIM card or a second network SIM card. The apparatus performs an unlock sequence for personalization based on a subscriber permanent identifier (SUPI) if the SIM card is determined to be a first network SIM card. The unlock sequence may include determining whether a SUPI of the first network SIM card matches with a SUPI stored in a secure file system (SFS) at the UE. The unlock sequence may further include initializing the UE to a network if the SUPI of the first network SIM card matches with the SUPI stored in the SFS at the UE.

30 Claims, 10 Drawing Sheets

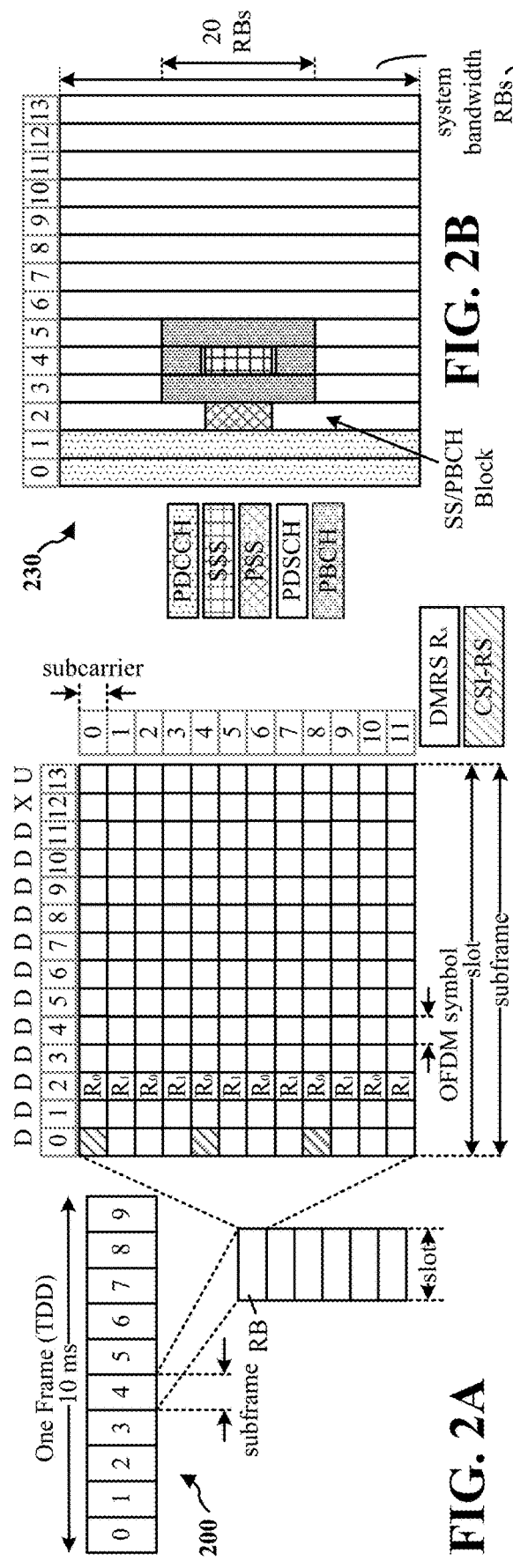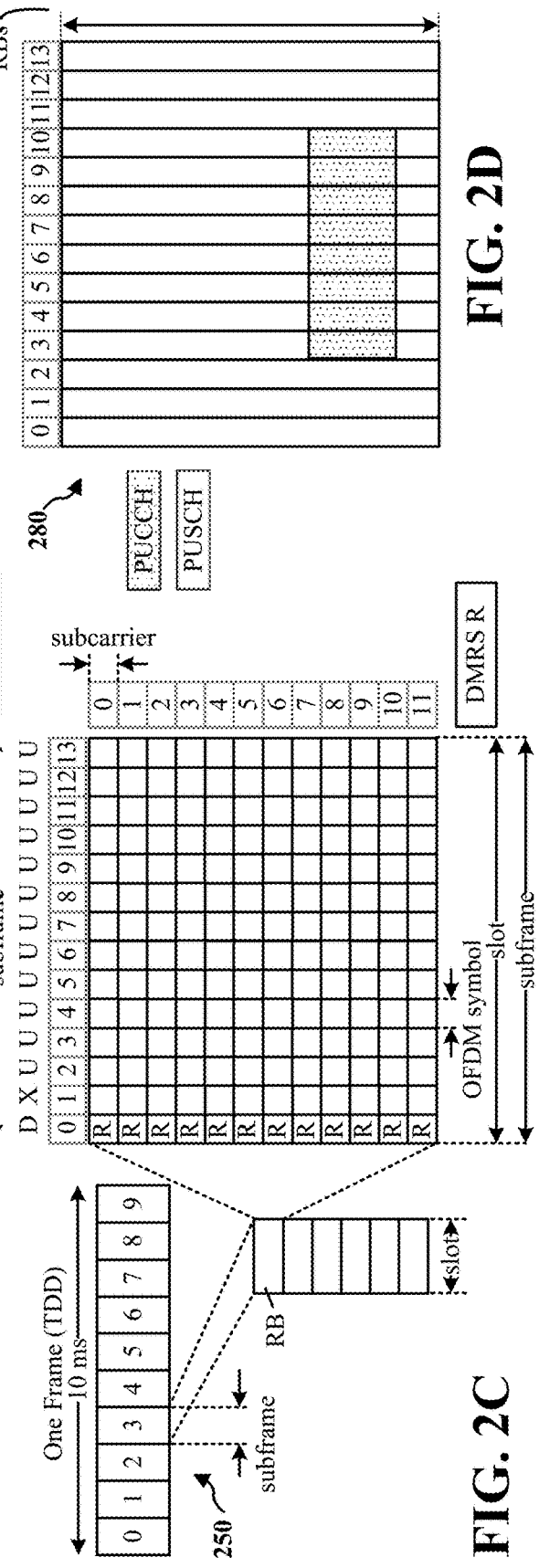
FIG. 2A  FIG. 2B  FIG. 2C  FIG. 2D

| Identifier: '6FZZ' | Structure: transparent | Optional |
|---|---|---|
| File size: X bytes | Update activity: low | |

Access Conditions:
READ
UPDATE          PIN
DEACTIVATE   ADM
ACTIVATE     ADM
             ADM

| Bytes | Description | M/O | Length |
|---|---|---|---|
| 1 to X | SUPI | M | X bytes |

INTELLIGENT PERSONALIZATION OF 5G TERMINALS FOR 5G AND PRE-5G SIM CARDS

BACKGROUND

Technical Field

The present disclosure relates generally to communication systems, and more particularly, to personalization of user equipment.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided, e.g., for wireless communication at a User Equipment (UE). The apparatus determines whether a subscriber identification module (SIM) card is a first network SIM card or a second network SIM card. If the SIM card is determined to be a first network SIM card, the apparatus performs an unlock sequence for personalization based on a subscriber permanent identifier (SUPI). The apparatus then determines whether the SUPI of the first network SIM card matches with a stored SUPI that is stored in a secure file system (SFS) at the UE. If the SUPI of the first network SIM card matches with the SUPI stored in the SFS at the UE, then the apparatus initializes the UE to a network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
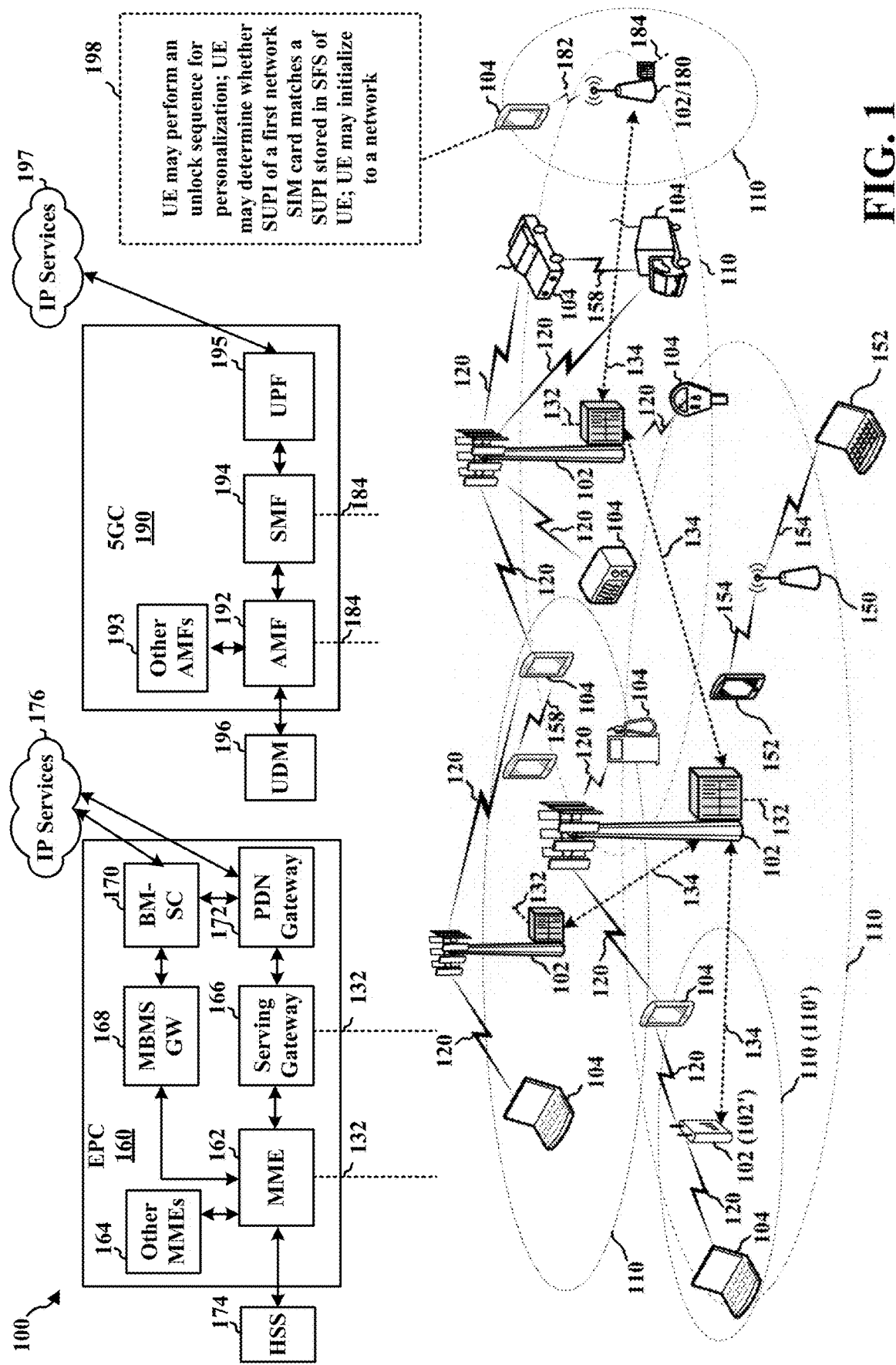
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. 5G NR may be referred to herein as "5G." In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform an unlock sequence for personalization (198) that may be based on a determination as to whether a SIM card is a first network SIM card or a pre-5G SIM card. The UE may first make a determination as to whether the SIM card supports 5G or not. If the SIM card supports 5G/NR, the UE 104 may determine whether a subscriber permanent identifier (SUPI) of a first network SIM card matches with a SUPI stored in a secure file system (SFS) at the UE. The UE 104 may be configured to initialize the UE to a network if the SUPI of the first network SIM card matches with the SUPI stored in the SFS at the UE. If the SIM card is not a 5G/NR SIM card, the UE may instead perform an IMSI based process. As used herein, a "first network SIM card" may refer to a SIM card that supports 5G and/or any wireless systems released subsequent to 5G. As further used herein, a "second network SIM card" may refer to a SIM card that supports pre-5G networks (e.g., 4G, 3GPPS, etc.). The terms first and second may be used herein to describe various networks and the disclosure is not intended to be limited by aspects disclosed herein. These terms are used to distinguish one network from another. Thus, a first network discussed herein may be a second network without departing from the disclosure. In some aspects, the first and second network may be a 5G network, a pre-5G network (e.g., 4G or 3GPPS, etc.) or a network released after the 5G network.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kKz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
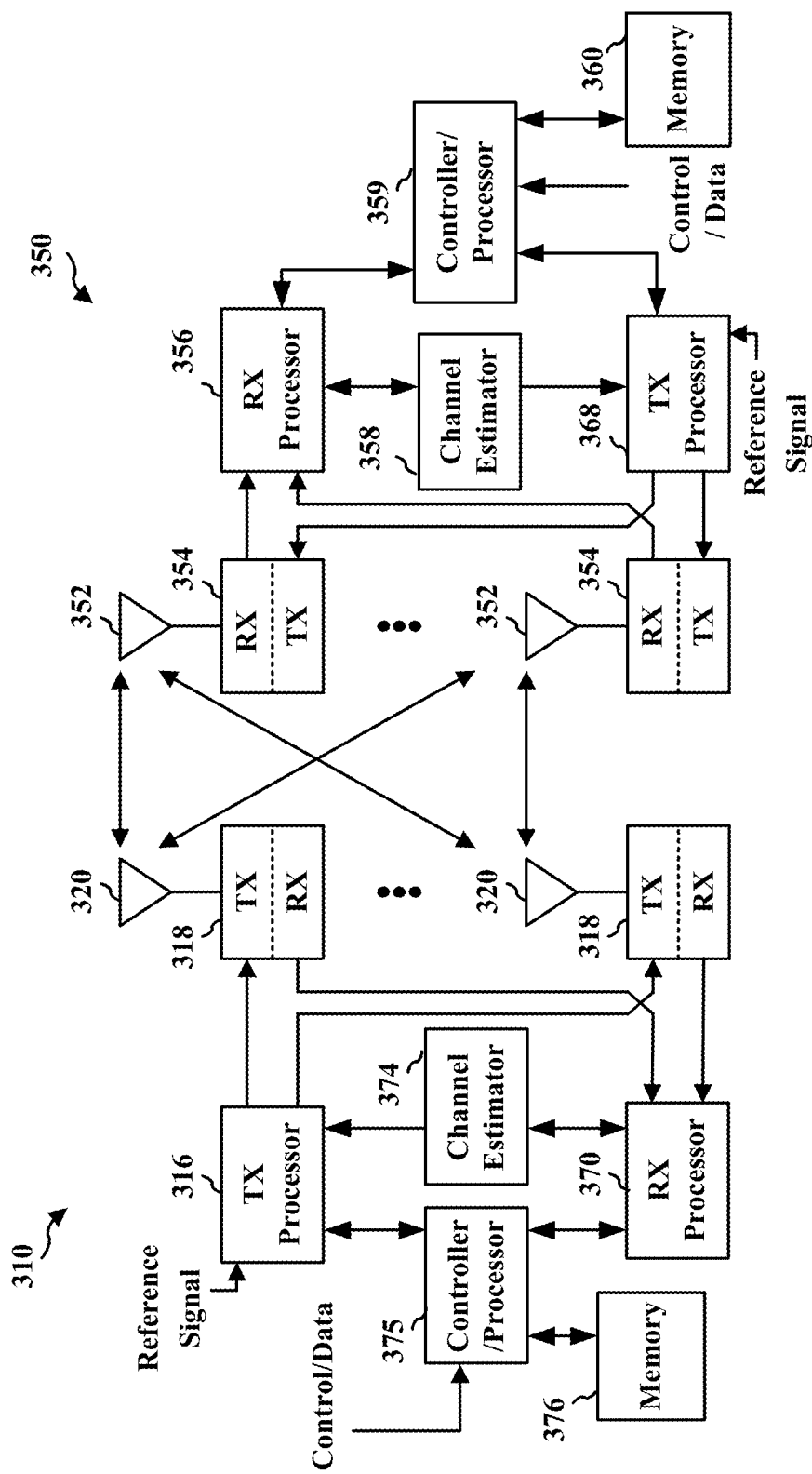
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Network operators may sell personalized devices (e.g., personalized UEs) to users at subsidy prices. The device subsidy can create a binding agreement between a subsidized UE and the network operator, such that any SIM card issued by the network operator may be used on the subsidized UE. This enables the network operator to received improved value through the UE device. Personalization security is important to ensure that the subsidized UEs operate with the network operator so that the network operator achieves a benefit for the UE devices sold at the subsidy prices. There are various personalization methods available on Pre-5G SIM cards. As one example, the personalization scheme may be based on any of an international mobile subscriber identity (IMSI), an integrated circuit card identifier (ICCID), mobile country codes/mobile network codes (MCC/MNC), and/or a group identifier (GID) file combination.

With the introduction of 5G, new elementary files (EFs) are added and new subscriber identifiers are defined for gaining access to 5G/NR network services. For example, 5G utilizes a subscriber permanent identifier (SUPI) that is a globally unique identifier allocated to each UE in a 5G network based on new parameters related to 5G SIM cards and/or services. In addition, EF-SUPI may be used to gain access to 5G services with a first network SIM card (e.g., 5G SIM card). However, if a second network or pre-5G SIM card (e.g., 4G or 3GPP SIM card) were to be inserted into a 5G UE device, the network personalization process will fail, because pre-5G SIM cards do not have the EF-SUPI. Thus, the UE would not function, even though the second network SIM card (e.g., 4G SIM card) may correspond to the network operator that subsidized the UE. The present application provides personalization aspects that ensure 5G terminals may be personalized using new parameters related to 5G SIM cards in a way that enables pre-5G SIM cards from the subsidizing network operator to also pass the personalization process. Thus, the present application provides a personalization mechanisms in which 5G terminals are capable of handling both pre-5G SIM cards and 5G SIM cards, e.g., from the same subsidizing network operator.

In some aspects, 5G terminals may be personalized based on EF-SUPI contents for 5G SIM cards along with IMSI personalization for pre-5G SIM cards. UEs can be personalized based on EF-SUPI contents for 5G SIM cards along with regular IMSI personalization for non-5G cards. The proposed method of personalization can be configured to ensure that 5G UE devices are personalized with EF-SUPI as well as IMSI personalization to allow any generation of SIM cards from the subsidizing network operator to be used with the device.

Figure 5A:
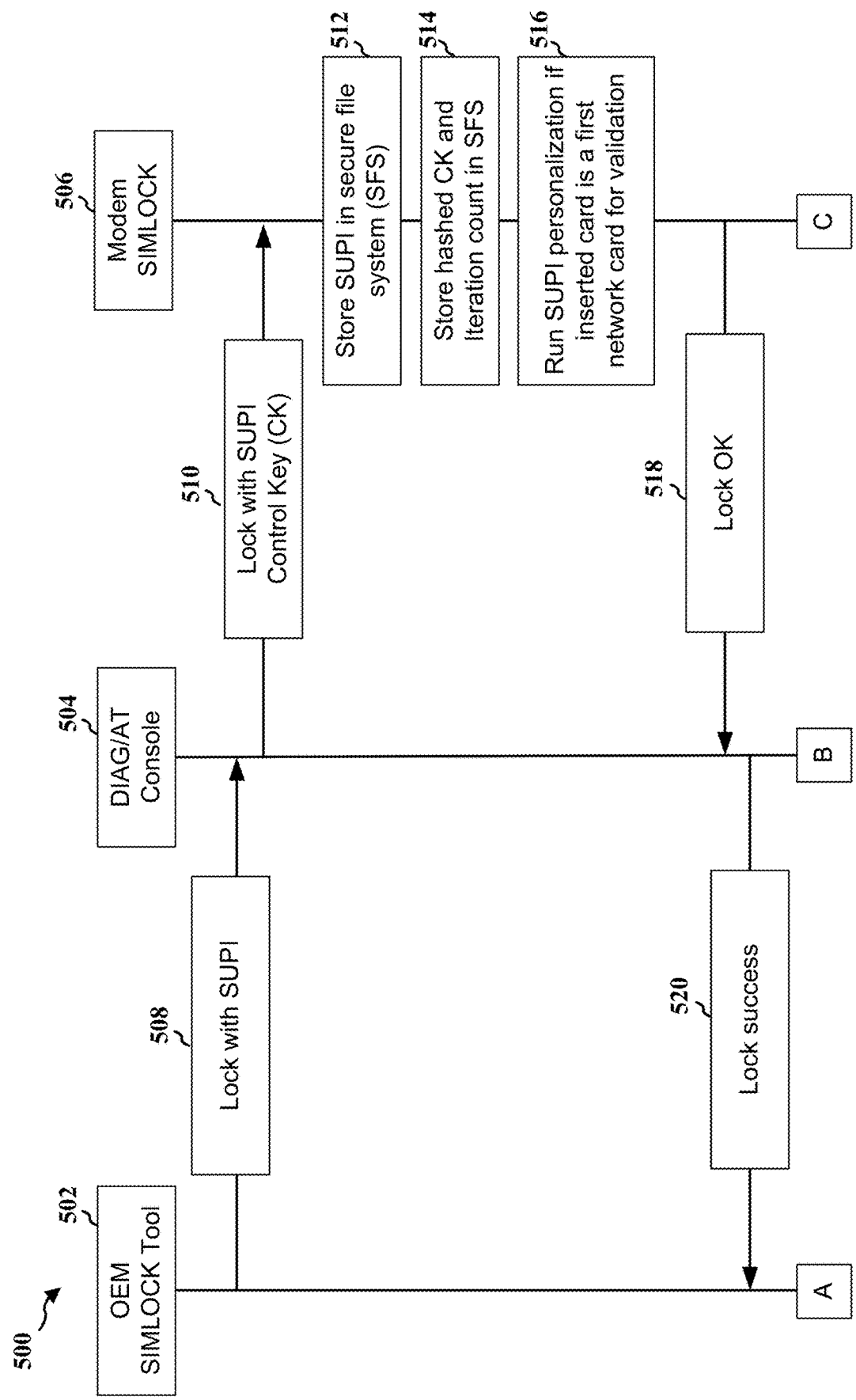
FIGS. 5A-5B are a diagram illustrating an unlock sequence of a UE in accordance with certain aspects of the disclosure.
Figure 5B:
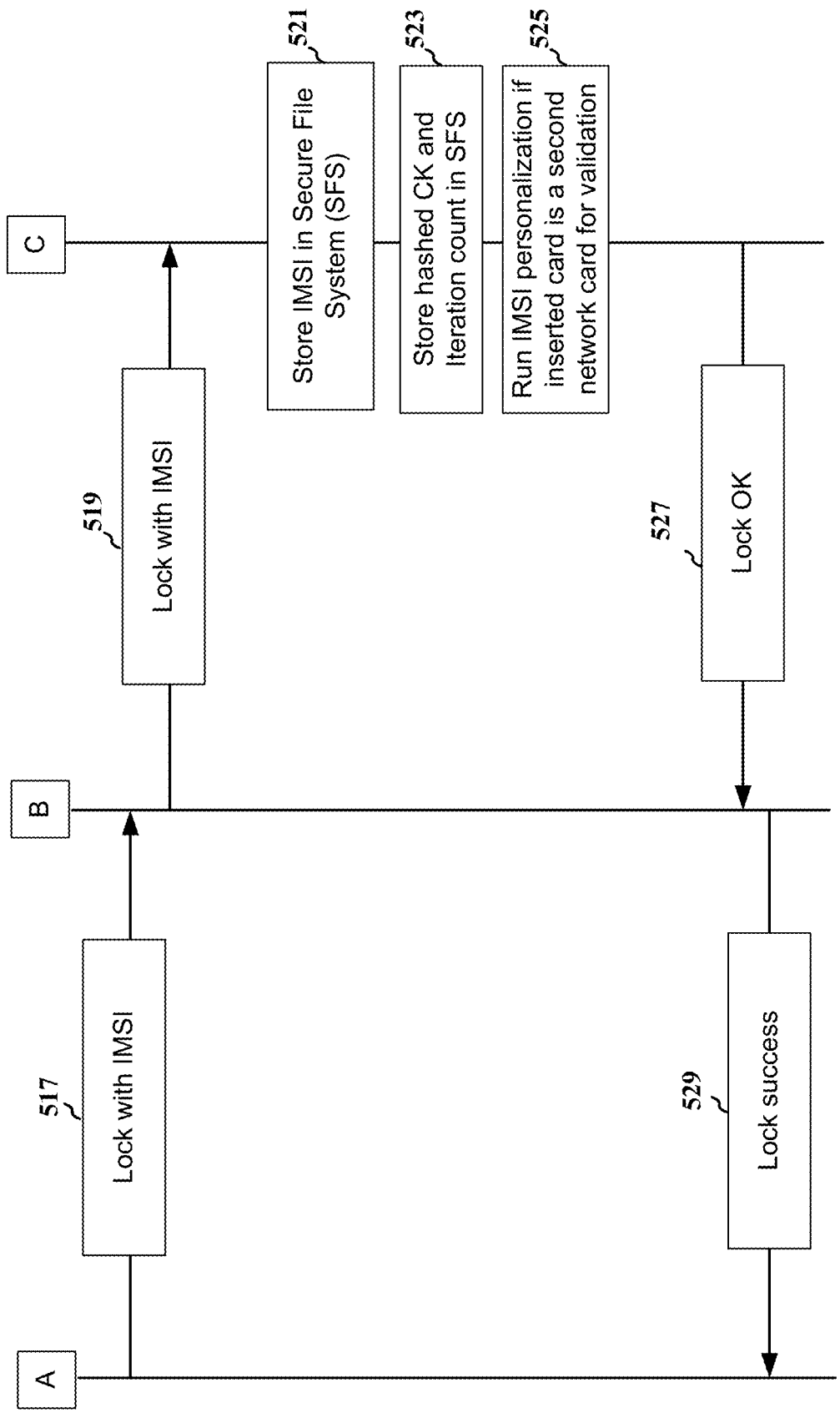

In some examples, a UE can be locked, e.g., at a manufacturing factory, using both a 5G SUPI personalization scheme and a pre-5G IMSI personalization scheme in order to allow the UE to be unlocked using any generation of SIM cards for the subsidizing operator network. FIGS. 5A-5B are a diagram illustrating a lock sequence 500 in accordance with certain aspects of the disclosure. The lock sequence 500 may be configured to utilize a SUPI personalization scheme to lock a UE (e.g., UE 104) to a network along with an IMSI personalization scheme, or other pre-5G personalization scheme. The lock sequence 500 may be performed at the factory, e.g., prior to launching the device to the market. The lock sequence 500 may utilize an original equipment manufacturer (OEM) SIM lock tool, e.g., SIMLOCK tool 502, a Diagnostic (DIAG) Access Terminal (AT), e.g., DIAG/AT console 504, at the UE, and a Modem SIMLOCK module 506 at the UE to personalize the UE to a network.

At 508, the OEM SIMLOCK tool 502 sends a command 508 to the DIAG/AT console 504 at the UE to lock the device using SUPI personalization scheme. At 510, the DIAG/AT console 504 sends a command 510 to the Modem SIMLOCK module 506 to lock the device. The command 510 may include the instructions to lock the device using SUPI personalization scheme along with a control key (CK). The CK may be generated by the DIAG/AT console 504.

At 512, the Modem SIMLOCK module 506 stores the SUPI in a secure file system (SFS) within the UE. At 514, the Modem SIMLOCK module 506 may generate a hashed CK based on the CK generated and received from the DIAG/AT console 504. An iteration count may also be stored within the SFS. At 516, the SUPI personalization scheme is re-run by the Modem SIMLOCK module 506 in order to validate the SIM card. The device will then be personalized or locked to the network after the SIM card has been validated.

Similarly, an OEM SIMLOCK tool 502 may provide a command 517 to the DIAG/AT console 504 to lock the UE based on an IMSI personalization scheme. The DIAG/AT console 504 of the UE may provide the IMSI based lock command 519 to the modem SIMLOCK module 506 of the UE to lock the device. The command 519 may include instructions to lock the device using IMSI personalization scheme along with a CK. The CK may be generated by the DIAG/AT console 504. At 521, the Modem SIMLOCK module 506 stores the IMSI based personalization information in the SFS within the UE. At 523, the Modem SIMLOCK module 506 may generate a hashed CK based on the CK generated and received from the DIAG/AT console 504. An iteration count may also be stored within the SFS. At 525, the IMSI personalization scheme is executed by the Modem SIMLOCK module 506 in order to validate the SIM card. The device will then be personalized or locked to the network after the SIM card has been validated.

At 518, the Modem SIMLOCK module 506 sends an indication 518 to the DIAG/AT console 504 indicating that the personalization is complete or an indication that the device is locked to the subsidizing operator. At 520, the DIAG/AT console 504 sends an indication to the OEM SIMLOCK tool 502 indicating that the lock sequence has been successful. The indication may indicate that the UE has been locked using both the SUPI based personalization scheme and the IMSI based personalization scheme. Alternately, separate indications may be provided to the OEM SIMLOCK tool 502 to indicate that the UE has been locked based on the SUPI based personalization scheme and the IMSI based personalization scheme. For example, at 527 the Modem SIMLOCK module 506 may send an indication 527 to the DIAG/AT console 504 indicating that the personalization is complete or an indication that the device is loced to the subsidizing operator. Also, at 529, the DIAG/AT console 504 may send an indication to the OEM SIMLOCK tool 502 indicating that the lock sequence has been successful. The UE may be locked in a manner that enables the UE to be unlocked using either the SUPI based personalization scheme or the IMSI based personalization scheme.

In an unlock procedure, the UE may be configured to first make a determination about which personalization scheme to use to unlock the device. For example, the UE may attempt to read an Elementary File (EF) for a Universal Subscriber Identity Module (USIM) Search Table, e.g., "$EF_{UST}$", to determine whether the SIM card is a first network SIM card (e.g., 5G SIM card) or a second network SIM card (e.g., pre-5G SIM card). The $EF_{UST}$ may be an EF that indicates which services are available. If a service is not indicated as available in the USIM. If the $EF_{UST}$ indicates that the SIM card is a 5G SIM card, then the UE may perform an unlock sequence using the SUPI personalization scheme. If the 5G device determines that the SIM card is a pre-5G SIM card, based on the attempt to read the $EF_{UST}$, then the UE may perform the unlock sequence using an IMSI personalization scheme.

In some aspects, the UE may attempt to read the $EF_{UST}$ to determine whether a SUPI storage service is enabled or disabled. A service number, e.g., "Service 124" or Service bit 124 (Subscription identifier privacy support) may indicate whether SUPI storage is enabled or does not have the service bit 124 in $EF_{UST}$. If the SUPI storage support service (e.g., Service bit 124 (Subscription identifier privacy support)) is enabled, then the SIM card may be determined to be a first network SIM card (e.g., 5G SIM card). If the SUPI storage support serviced is disabled or not present, then the SIM card may be determined to be a second network SIM card (e.g., pre-5G SIM card). In some examples, the SUPI storage support service (e.g., Service bit 124 (Subscription identifier privacy support)) may indicate that the EF contains a SUPI that is not in an IMSI format.

Figure 4:
FIG. 4 is a diagram illustrating a Subscription Permanent Identifier chart in accordance with certain aspects of the disclosure.

If the UE determines that the SIM card is a 5G SIM card, based on the SUPI support service being enabled, then the UE may perform a SUPI personalization unlock sequence. The UE may compare the locked configuration of the UE, e.g., as determined in the lock sequence in FIG. 5 with SUPI information stored at the SIM card, e.g., in an Elementary File for the SUPI, e.g., $EF_{SUPI}$. A file for the $EF_{SUPI}$ may be present if the SUPI storage support service is enabled. FIG. 4 is a diagram illustrating an example chart 400 for the $EF_{SUPI}$, in accordance with certain aspects of the disclosure. The $EF_{SUPI}$ may be configured in a format that is different than the format for IMSI. However, if the SUPI is configured using a similar type to the IMSI, the SUPI may be stored in $EF_{IMSI}$ rather than $EF_{SUPI}$. The $EF_{SUPI}$ may store an indication of a first SUPI, e.g., using bytes 1 to X, along with a description of the SUPI. Using bytes X+1 to Y, the chart may store another indication of a second SUPI with a corresponding description, and so forth. Thus, the $EF_{SUPI}$ may store indicates for at least one SUPI.

Figure 6:
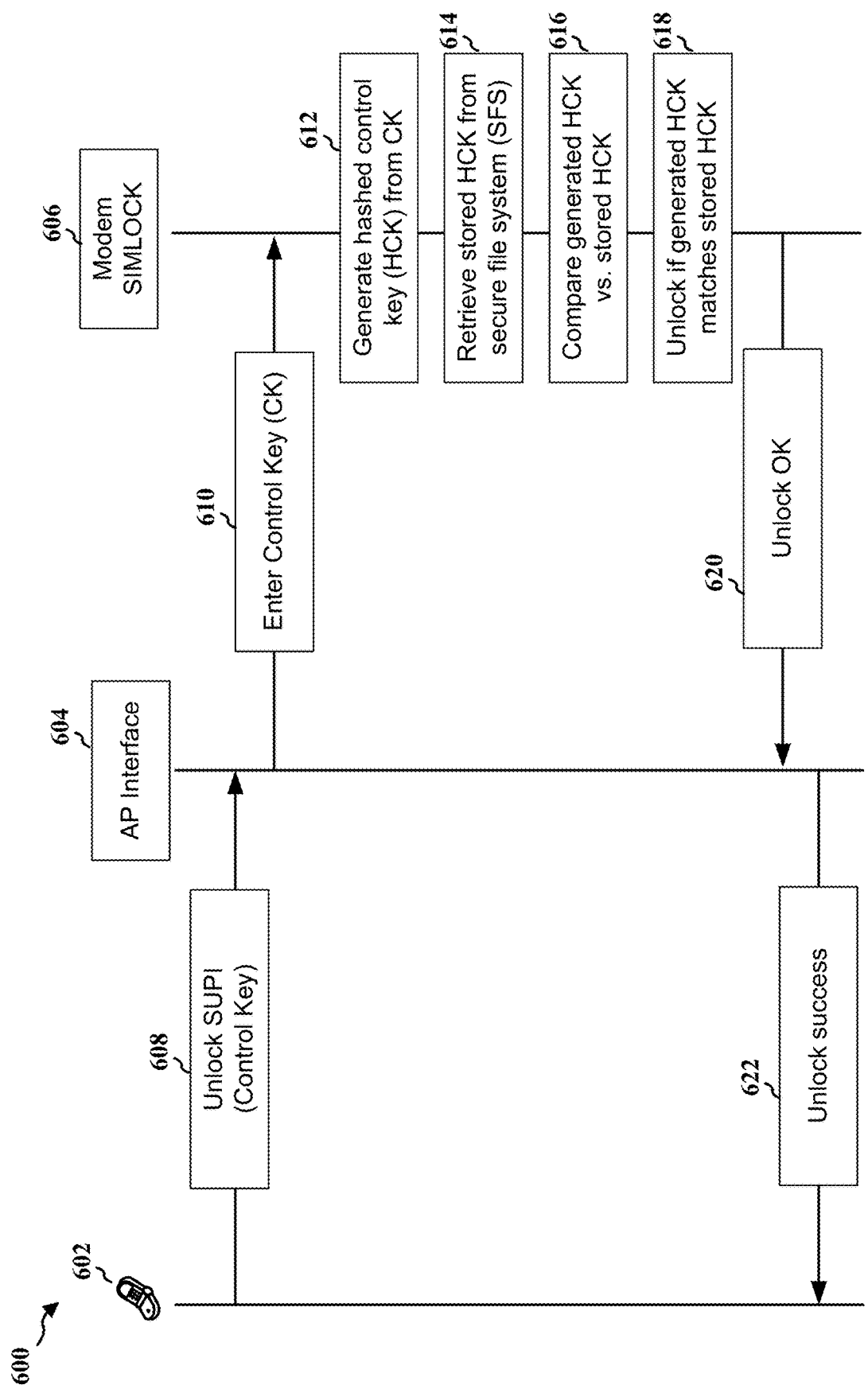
FIG. 6 is a diagram illustrating a lock sequence of a UE in accordance with certain aspects of the disclosure.

FIG. 6 is a diagram illustrating an example unlock sequence 600 for unlocking a UE 602 (e.g., UE 104) a SUPI based personalization scheme in accordance with certain aspects of the disclosure. The unlock sequence 600 may be performed once the UE determines that the SIM card is a 5G SIM card, e.g., by determining that a SUPI storage service is enabled, e.g., in the $EF_{UST}$. The unlock sequence 600 may be configured to unlock a UE 602 from the network that was locked using both a SUPI personalization scheme and an IMSI personalization scheme, as described in connection with FIG. 5. The lock sequence 600 may be performed at the UE, e.g., after the UE has been purchased from the network operator. The user may desire to unlock the UE that is subsidy locked to the network, using a SIM card. The lock sequence 600 may involve the UE 602, an AP interface 604 at the UE, and a Modem SIMLOCK module 606 at the UE to unlock the UE.

At 608, the user may initiate the unlock sequence 600 by sending a command 608 to the AP interface 604. The command 608 may comprise an unlock request that includes a control key. The control key may be entered into a user interface (UI) of the UE 602 to initiate the unlock sequence 600. The control key may be obtained from the network operator in order to initiate the unlock sequence 600.

At 610, the AP interface 604 sends an indication 610 to the Modem SIMLOCK module 606, e.g., including the CK. At 612, the Modem SIMLOCK module 606 generates a hashed CK (HCK) from the CK received from the AP interface 604. At 614, the Modem SIMLOCK module 606 retrieves the stored HCK, generated at 514 of FIG. 5, from the SFS. At 616, the Modem SIMLOCK module 606 compares the generated HCK, generated at 512, with the stored HCK, generated at 514 of FIG. 5. At 618, the Modem SIMLOCK module 606 unlocks the UE if the generated HCK and the stored HCK match. If the generated HCK and the stored HCK do not match, then the unlock sequence 600 is considered as failed, and the UE will remain locked to the network.

At 620, if the generated HCK and the stored HCK match, then the Modem SIMLOCK module 606 will send a command to the AP interface 604 indicating that the unlock sequence 600 is complete or that the UE 602 is unlocked. At 622, the AP interface 604 sends a command to the UE 602 indicating that the unlock sequence was successful. At this point, the UE 602 is no longer locked to the network, such that a SIM card from any network operator may be used with the UE 602.

If the UE determines that the SIM card is a second network SIM card (e.g., pre-5G SIM card), then the IMSI personalization scheme will be utilized to unlock the UE instead of the SUPI personalization scheme. In the unlock sequence based on the IMSI personalization scheme, the 5G device compares the pre-5G SIM card $EF_{IMSI}$ with the locked configuration. If the lock configuration does not match, then the device will be remain in the personalized state and present an option for the user to enter the unlock key to depersonalize the device. The ability for the proposed method to dynamically select the personalization scheme allows any generation SIM cards to function on new 5G devices.

The aspects presented herein that provide a mechanism to personalize 5G terminals in a manner that enables use with 5G SIM cards and/or pre-5G SIM cards. The mechanism may involve locking the UE with both a SUPI based personalization scheme and an IMSI based personalization scheme and to dynamically select the personalization scheme for unlocking the UE based on the type SIM card used with the device. The ability for the UE to utilize 5G SIM cards and/or pre-5G SIM cards may allow any generation of network operator SIM cards to work on 5G devices. In addition, users may be able to switch different SIM cards in the event that a certain geographic area does not provide 5G coverage. In such instances, users would be able to insert a pre-5G SIM card and utilize their 5G device in areas that may not offer 5G coverage.

Figure 7:
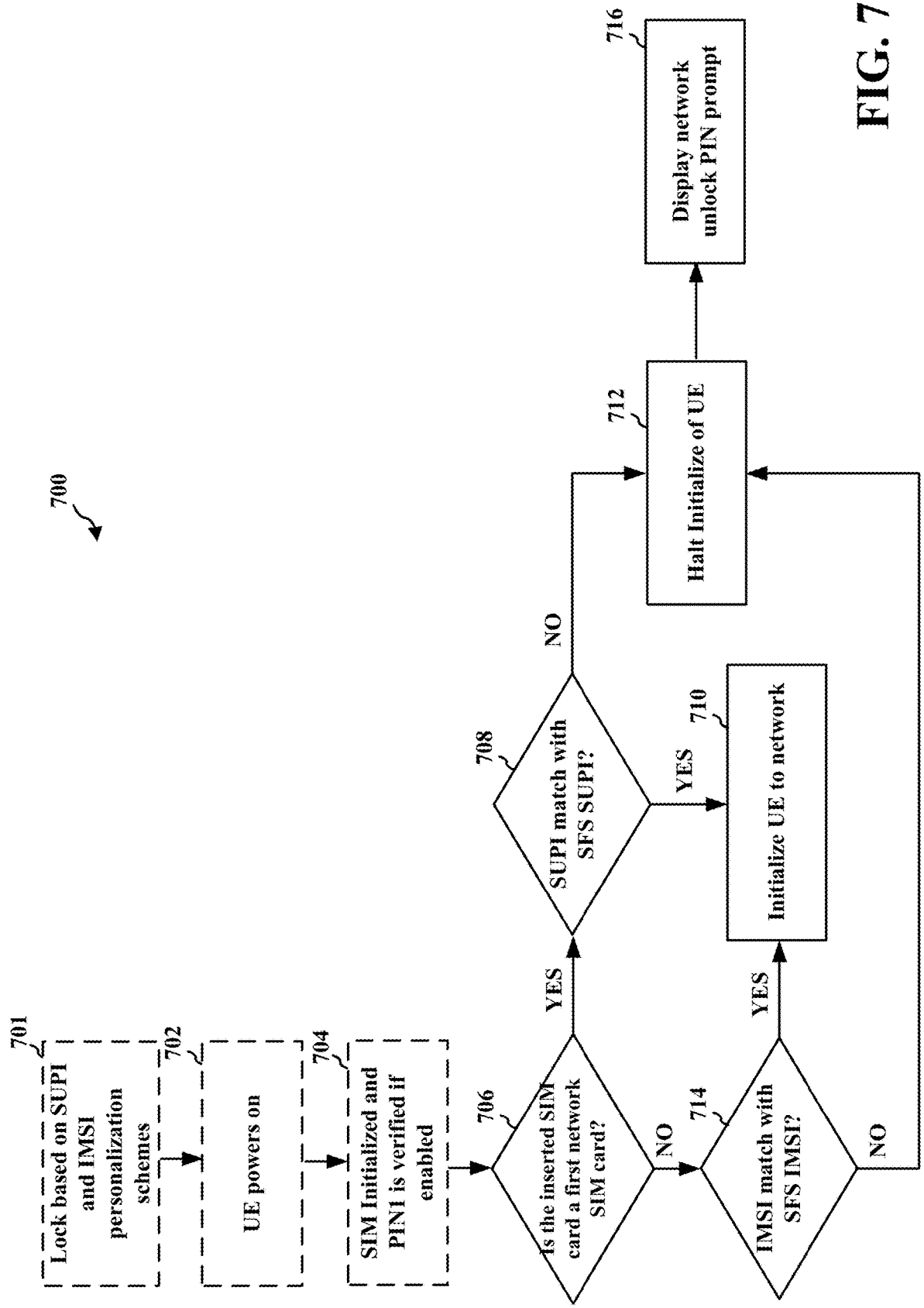
FIG. 7 is a flowchart of a method to personalize a UE to a network.

FIG. 7 is a flowchart of a method to personalize a UE to a network. The method may be performed by a UE (e.g., UE 104, 350, 602). The UE may comprise a 5G device. Optional aspects are illustrated with a dashed line. The method may be configured to personalize a UE to a subsidizing operator in a way that enables the UE to be unlocked using a first network SIM card (e.g., 5G SIM card) or a using a second network SIM card (e.g., pre-5G SIM card). The method provides the flexibility in 5G devices allowing them to accept any generation of SIM cards for the subsidizing operator.

As illustrated at 701, in some aspects, the UE may lock based on both a SUPI based personalization scheme and an IMSI based personalization scheme, as described in connection with the example of FIG. 5. The UE may be locked, e.g., based on interaction with a factory tool. In such aspects, the UE may based on the SUPI based personalization scheme or the IMSI based personalization scheme. For example, the UE may initialize to a network as a part of unlocking.

At 702, the UE device may be powered on, and the SIM card may be initialized. In some aspects, for example at 704, the user may be required to enter a PIN1 to enable the device. The PIN1 may provide a security feature that prevents the UE from initializing in the event that the UE is lost or stolen.

At 706, the UE may determine whether the SIM card is a 5G SIM card or a pre-5G SIM card. For example, the UE may determine whether the SIM card is the 5G SIM card or the pre-5G SIM card based on attempting to read an $EF_{UST}$ to determine whether a SUPI storage service (e.g., Service bit 124 (Subscription identifier privacy support)) is enabled or disabled. If the $EF_{UST}$ indicates that SUPI storage is enabled, the UE may determine the SIM card to be the 5G SIM card, and if the $EF_{UST}$ does not indicate that SUPI storage (e.g., Service bit 124 (Subscription identifier privacy support)) is enabled or does not have the service bit 124 in $EF_{UST}$, the UE may determine the SIM card to be the pre-5G SIM card. In some aspects, the service that the UE reads in the $EF_{UST}$ to determine whether the SIM card is a pre-5G SIM card or is a 5G SIM card based on whether a SUPI support service, e.g., "Service n° yyy", in enabled, as described in connection with FIG. 4.

If a determination is made, at 706, that the SIM card is a first network SIM card (e.g., 5G SIM card), then the UE may be configured to perform an unlock sequence for personalization based on SUPI. The unlock sequence may comprise, e.g., determining whether a SUPI of the 5G SIM card matches with a SUPI stored within a secure file system (SFS) at the UE, at 708. The SUPI may be provided or generated by OEM SIMLOCK tool 502 of FIG. 5, and may be stored in the SFS at 512 by the Modem SIMLOCK module 506, e.g., as part of the locking process. The unlock sequence may further comprise initializing the UE to a network, at 710, if the SUPI of the 5G SIM card matches with the stored SUPI that is stored in the SFS at the UE. The UE then camps on the network associated with the SIM card.

However, if a determination is made, at 708, that the SUPI of the 5G SIM card does not match with the SUPI stored within the SFS, then, at 712, initialization of the UE is halted. In such instances, the UE would remain locked and may display an unlock screen on the UI of the UE. For example, the UE may display a network unlock PIN prompt on a display of the UE, at 716, if the SUPI of the 5G SIM card does not match with the stored SUPI that is stored in the SFS. The UE will be prevented from camping onto the network associated with the SIM card.

Referring back to 706, if a determination is made that the SIM card is not a first network SIM card, then the SIM card is determined to be a second network SIM card (e.g., pre-5G SIM card), then the UE may be configured to perform an unlock sequence for personalization based on IMSI. The IMSI unlock sequence may be performed at 714, where another determination step is performed. As illustrated at 714, performing the unlock sequence based on the IMSI may include determining whether an IMSI of the pre-5G SIM card matches the IMSI stored in the SFS.

If a determination is made that the IMSI of the pre-5G SIM card matches the IMSI stored within the SFS, then the device continues and may initialize with a network, at 710. The UE then camps onto the network associated with the pre-5G SIM card. However, if a determination is made that the IMSI of the pre-5G SIM card does not match with the IMSI stored within the SFS, then, at 712, initialization of the UE may be halted. In such instances, the UE would be locked and will display an unlock screen on the UI of the UE. For example, the UE may display a network unlock PIN prompt on a display of the UE, at 716, if the IMSI of the pre-5G SIM card does not match with the IMSI stored in the SFS. The UE will be prevented from camping onto the network associated with the SIM card.

In some aspects, the method may be configured to determine whether the SIM card is the 5G SIM card or the pre-5G SIM card based on attempting to read an $EF_{UST}$ to determine if SUPI service is enabled or disabled. In such instances, if the $EF_{UST}$ indicates that SUPI service is enabled, then the UE determines that the SIM card is a 5G SIM card. In other instances, if the $EF_{UST}$ does not indicates that the SU PI service is enabled, then the UE determines that the SIM card is the pre-5G SIM card.

Thus, the UE may be configured to dynamically select a personalization scheme based on a type of the SIM card used with the UE.

In some aspects, as a part of the unlock sequence based on the SUPI scheme, the UE may generate an HCK from a given CK, such as described in connection with 612. Additionally, the UE may retrieve a stored HCK from the SFS, as described in connection with 614, and compare it to a generated HCK, as described in connection with 616. As a part of the SUPI scheme, the UE may unlock the UE if the stored HCK matches the generated HCK, e.g., as described in connection with 618.

At least one advantage of the disclosure is that users will have the option to use any generation of SIM cards to unlock a UE that has been personalized based on a subsidizing network operator. This may allow users flexibility of selecting network providers in different areas, especially if 5G services and/or coverage is not provided. At least another advantage of the disclosure is that the UE will be able to dynamically determine which personalization sequence to use based on the type of SIM card inserted.

Figure 8:
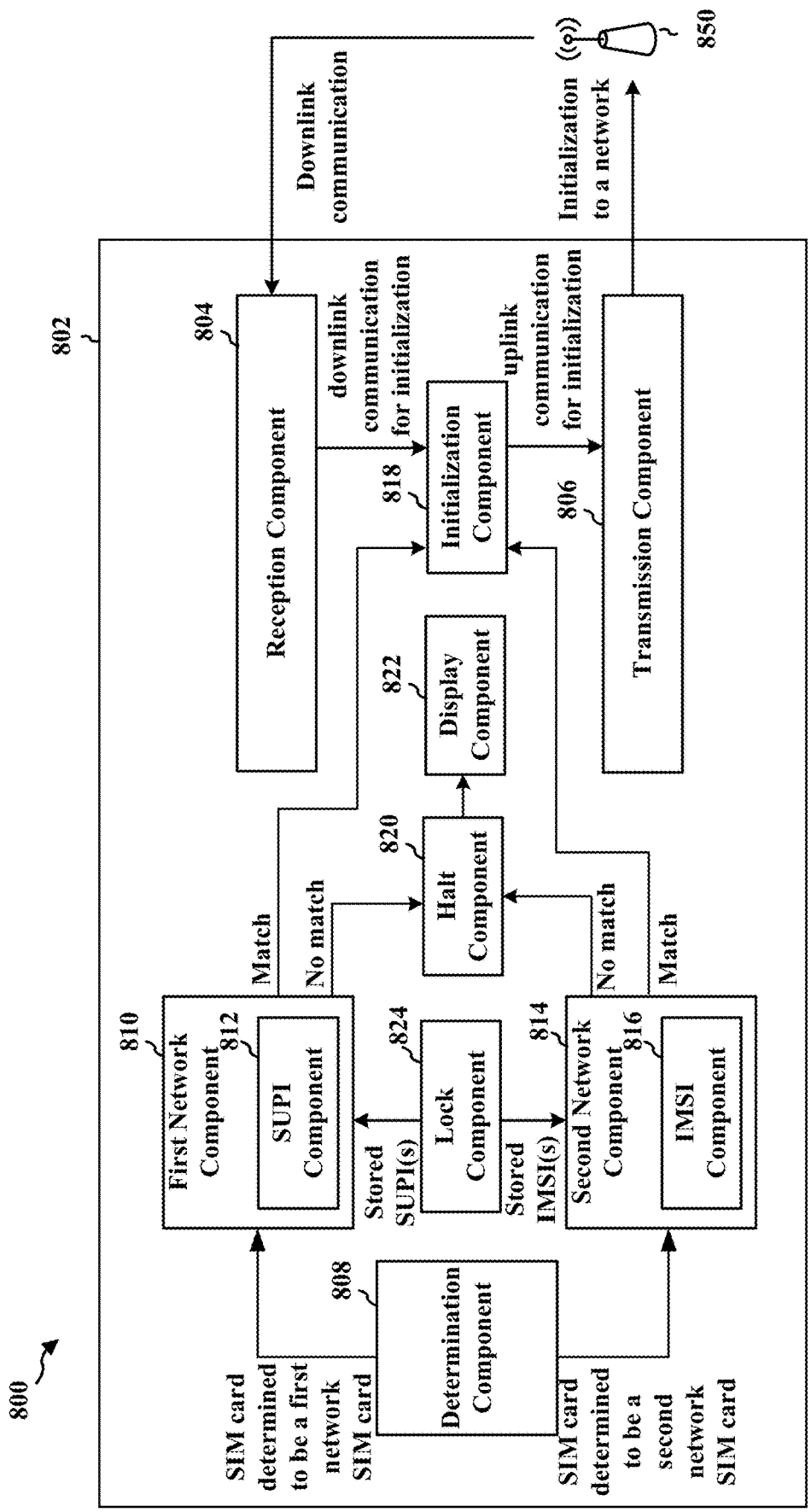
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a UE (e.g., UE 104, 350, 602). The apparatus includes a reception component 804 that receives downlink communication, e.g., from base station 850, and a transmission component 806 that transmits uplink communication to the base station 850. For example, the apparatus may transmit and/or receive such communication with the base station after unlocking based on either a SUPI based personalization scheme or an IMSI based personalization scheme, e.g., as described in connection with FIGS. 5, 6, and/or 7.

The apparatus may include a determination component 808 configured to determine whether a SIM card is a first network SIM card (e.g., 5G SIM card) or a second network SIM card (e.g., Pre-5G SIM card), and a first network component (e.g., 5G) 810 configured to perform an unlock sequence for personalization based on a SUPI if the SIM card is determined to be a 5G SIM card. The 5G component 810 may comprise a SUPI component 812 configured to determine whether the SUPI of the 5G SIM card matches with a stored SUPI that is stored in an SFS at the apparatus, e.g., as described in connection with 708 in FIG. 7 and/or 612, 614, 616, and/or 618 in FIG. 6.

The apparatus may include a second network component (e.g., pre-5G network) 814 configured to perform the unlock sequence for personalization based on an IMSI if the SIM card is determined to be the Pre-5G SIM card. The pre-5G component 814 may comprise an IMSI component 816 configured to determine whether the IMSI of the pre-5G SIM card matches with a stored IMSI that is stored in an SFS at the apparatus.

The apparatus may comprise an initialization component 818 configured to initialize the apparatus to a network if the SUPI of the 5G SIM card matches with the stored SUPI that is stored in the SFS at the UE or if the IMSI of the Pre-5G SIM card matches the IMSI stored in the SFS.

The apparatus may comprise a halt component 820 configured to halt initialization of the UE, e.g., if the SUPI of the 5G SIM card does not match with the stored SUPI that is stored in the SFS or if the IMSI of the Pre-5G SIM card does not match with the IMSI stored in the SFS, based on the personalization scheme being used to unlock the UE. The apparatus may comprise a display component 822 configured to display a network unlock PIN prompt on a display of the UE, e.g., if the SUPI of the 5G SIM card does not match with the stored SUPI that is stored in the SFS or if the IMSI of the pre-5G SIM card does not match with the IMSI stored in the SFS, based on the personalization scheme being used to unlock the UE.

The apparatus may further a lock component 824 configured to lock the apparatus based on both a SUPI based personalization scheme and an IMSI based personalization scheme. Any of the determination component 808, the 5G component 810, the pre-5G component 814, and/or the initialization component 818 may be configured to unlock the apparatus based on one of the SUPI based personalization scheme or the IMSI based personalization scheme.

The apparatus may include additional components that perform each of the blocks of the algorithm in the aforementioned flowcharts of FIGS. 5, 6, and/or 7. As such, each block in the aforementioned flowcharts of FIGS. 5, 6, and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
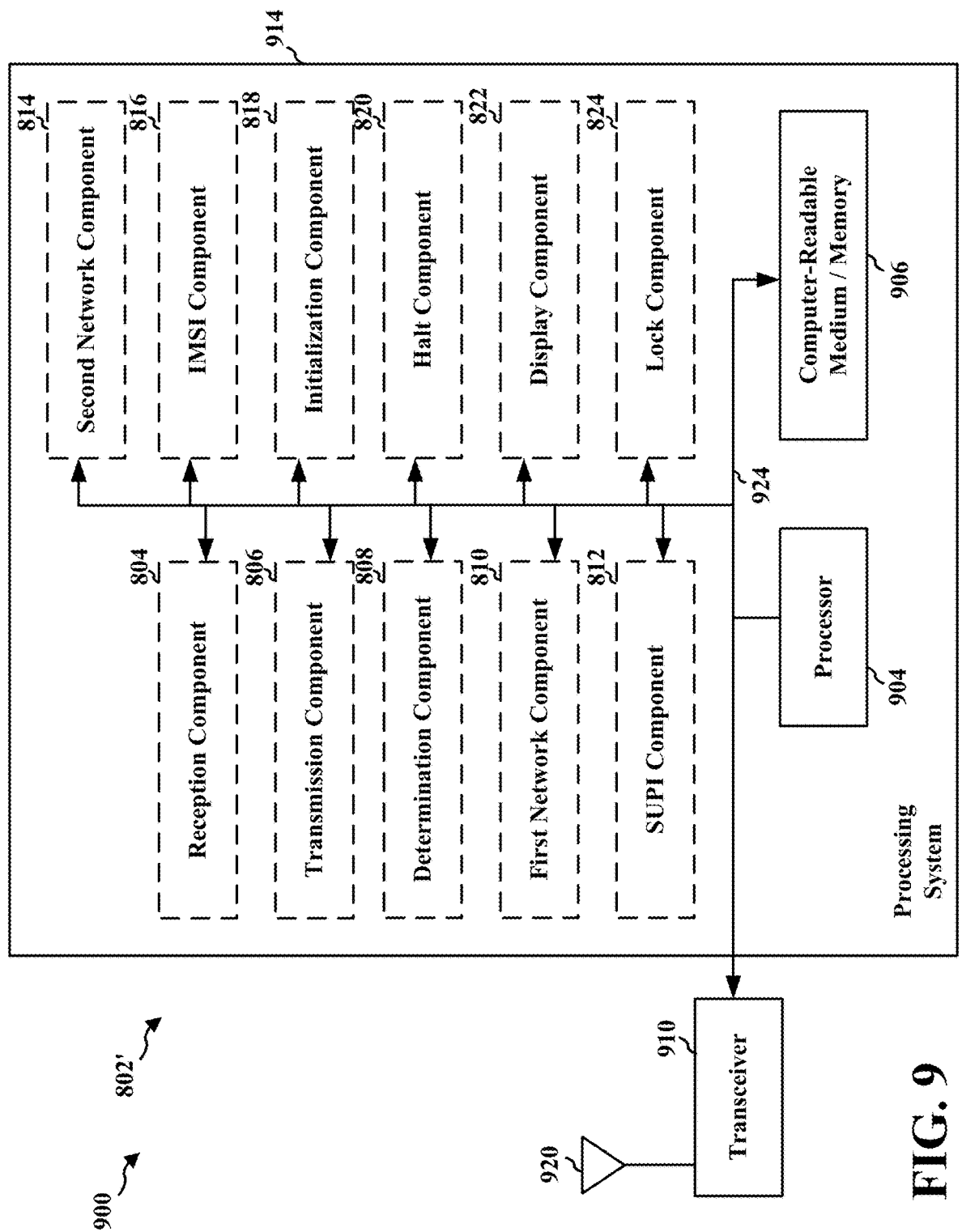
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, 816, 818, 820, 822, 824, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, 814, 816, 818, 820, 822, 824. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining whether a SIM card is a first network SIM card (e.g., 5G SIM card) or a second network SIM card (e.g., Pre-5G SIM card), means for performing an unlock sequence for personalization based on a SUPI if the SIM card is determined to be a first network SIM card; means for determining whether the SUPI of the first network SIM card matches with a stored SUPI that is stored in an SFS at the UE; means for performing the unlock sequence for personalization based on an IMSI if the SIM card is determined to be the second network SIM card; means for determining whether an IMSI of the second network SIM card matches with an IMSI stored in the SFS; means for initializing the UE to a network if the SUPI of the first network SIM card matches with the stored SUPI that is stored in the SFS at the UE or if the IMSI of the second network SIM card matches the IMSI stored in the SFS; means for halting initialization of the UE, e.g., if the SUPI of the first network SIM card does not match with the stored SUPI that is stored in the SFS or if the IMSI of the second network SIM card does not match with the IMSI stored in the SFS, based on the personalization scheme being used to unlock the UE; means for displaying a network unlock PIN prompt on a display of the UE, e.g., if the SUPI of the first network SIM card does not match with the stored SUPI that is stored in the SFS or if the IMSI of the second network SIM card does not match with the IMSI stored in the SFS, based on the personalization scheme being used to unlock the UE; means for locking based on both a SUPI based personalization scheme and an IMSI based personalization scheme; and means for unlocking based on one of the SUPI based personalization scheme or the IMSI based personalization scheme. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The present disclosure provides a mechanism to personalize 5G terminals with both 5G SIM cards and pre-5G SIM cards. In some aspects, 5G terminals may be personalized based on EF-SUPI contents for 5G SIM cards along with IMSI personalization for pre-5G SIM cards. Devices can be personalized based on EF-SUPI contents for 5G SIM cards along with regular IMSI personalization for non-5G cards. The proposed method of personalization can be configured to ensure that 5G devices may be personalized with EF-SUPI as well as IMSI personalization to allow any generation of SIM cards (e.g., 5G SIM or pre-5G SIM cards) to be used with the device, e.g., from the same network operator.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method to personalize a User Equipment (UE), comprising:
   determining whether a subscriber identification module (SIM) card is a first network SIM card or a second network SIM card;
   performing an unlock sequence for personalization based on a subscriber permanent identifier (SUPI) if the SIM card is determined to be a first network SIM card, wherein the unlock sequence comprises:
      determining whether the SUPI of the first network SIM card matches with a stored SUPI that is stored in a secure file system (SFS) at the UE; and
      initializing the UE to a network if the SUPI of the first network SIM card matches with the stored SUPI that is stored in the SFS at the UE.

2. The method of claim 1, further comprising:
   locking based on both a SUPI based personalization scheme and an IMSI based personalization scheme.

3. The method of claim 2, further comprising:
   unlocking based on one of the SUPI based personalization scheme or the IMSI based personalization scheme.

4. The method of claim 1, wherein the UE determines whether the SIM card is the first network SIM card or the second network SIM card based on attempting to read an Elementary File for a Universal Service Table ($EF_{UST}$) to determine whether Subscription identifier privacy support (Service bit 124 of $EF_{UST}$) is enabled or disabled, wherein if the $EF_{UST}$ indicates that the Subscription identifier privacy support (Service bit 124 of $EF_{UST}$) is enabled, the UE determines the SIM card to be the first network SIM card and if the $EF_{UST}$ does not indicate that the Subscription identifier privacy support (Service bit 124 of $EF_{UST}$) is enabled or does not have the service bit 124 in $EF_{UST}$, the UE determines the SIM card to be the second network SIM card.

5. The method of claim 1, performing the unlock sequence based on the SUPI if the UE determines the SIM card is the first network SIM card, further comprises:
   generating a hashed control key (HCK) from a given control key (CK);
   retrieving a stored HCK from the SFS; and
   comparing the generated HCK with the stored HCK; and
   unlocking the UE if the generated HCK matches the stored HCK.

6. The method of claim 1, further comprising:
   halting initialization of the UE if the SUPI of the first network SIM card does not match with the stored SUPI that is stored in the SFS.

7. The method of claim 6, further comprising:
   displaying a network unlock personal identification number (PIN) prompt on a display of the UE if the SUPI of the first network SIM card does not match with the stored SUPI that is stored in the SFS.

8. The method of claim 1, further comprising:
   performing the unlock sequence for personalization based on an international mobile subscriber identity (IMSI) if the SIM card is determined to be the second network SIM card; and
   initializing the UE to the network if the IMSI of the second network SIM card matches the IMSI stored in the SFS.

9. The method of claim 8, wherein performing the unlock sequence based on the IMSI comprises:
   determining whether an IMSI of the second network SIM card matches with an IMSI stored in the SFS.

10. The method of claim 9, further comprising:
    halting initialization of the UE if the IMSI of the second network SIM card does not match with the IMSI stored in the SFS; and
    displaying a network unlock personal identification number (PIN) prompt on a display of the UE if the IMSI of the second network SIM card does not match with the IMSI stored in the SFS.

11. The method of claim 8, wherein the UE is configured to dynamically select a personalization scheme based on a type of the SIM card used with the UE.

12. An apparatus to personalize a User Equipment (UE), comprising:
    means for determining whether a subscriber identification module (SIM) card is a first network SIM card or a second network SIM card;
    means for performing an unlock sequence for personalization based on a subscriber permanent identifier (SUPI) if the SIM card is determined to be a first network SIM card, wherein the unlock sequence comprises:
       means for determining whether the SUPI of the first network SIM card matches with a stored SUPI that is stored in a secure file system (SFS) at the UE; and
       means for initializing the UE to a network if the SUPI of the first network SIM card matches with the stored SUPI that is stored in the SFS at the UE.

13. The apparatus of claim 12, further comprising:
    means for locking based on both a SUPI based personalization scheme and an IMSI based personalization scheme.

14. The apparatus of claim 13, further comprising:
    means for unlocking based on one of the SUPI based personalization scheme or the IMSI based personalization scheme.

15. The apparatus of claim 12, wherein the UE determines whether the SIM card is the first network SIM card or the second network SIM card based on attempting to read an Elementary File for a Universal Service Table ($EF_{UST}$) to determine whether Subscription identifier privacy support (Service bit 124 of $EF_{UST}$) is enabled or disabled, wherein if the $EF_{UST}$ indicates that the Subscription identifier privacy support (Service bit 124 of $EF_{UST}$) is enabled, the UE determines the SIM card to be the first network SIM card and if the $EF_{UST}$ does not indicate that the Subscription identifier privacy support (Service bit 124 of $EF_{UST}$) is enabled or does not have the service bit 124 in $EF_{UST}$, the UE determines the SIM card to be the second network SIM card.

16. The apparatus of claim 12, wherein the means for performing the unlock sequence based on the SUPI, if the UE determines the SIM card is the first network SIM card, generate a hashed control key (HCK) from a given control key (CK), retrieve a stored HCK from the SFS; compare the generated HCK with the stored HCK; and unlock the UE if the generated HCK matches the stored HCK.

17. The apparatus of claim 12, further comprising:
means for halting initialization of the UE if the SUPI of the first network SIM card does not match with the stored SUPI that is stored in the SFS.

18. The apparatus of claim 17, further comprising:
means for displaying a network unlock personal identification number (PIN) prompt on a display of the UE if the SUPI of the first network SIM card does not match with the stored SUPI that is stored in the SFS.

19. The apparatus of claim 12, further comprising:
means for performing the unlock sequence for personalization based on an international mobile subscriber identity (IMSI) if the SIM card is determined to be the second network SIM card; and
means for initializing the UE to the network if the IMSI of the second network SIM card matches the IMSI stored in the SFS.

20. The apparatus of claim 19, wherein performing the unlock sequence based on the IMSI comprises:
means for determining whether an IMSI of the second network SIM card matches with an IMSI stored in the SFS.

21. The apparatus of claim 20, further comprising:
means for halting initialization of the UE if the IMSI of the second network SIM card does not match with the IMSI stored in the SFS; and
means for displaying a network unlock personal identification number (PIN) prompt on a display of the UE if the IMSI of the second network SIM card does not match with the IMSI stored in the SFS.

22. The apparatus of claim 19, wherein the UE is configured to dynamically select a personalization scheme based on a type of the SIM card used with the UE.

23. An apparatus to personalize a User Equipment (UE), comprising:
a memory; and
at least one processor coupled to the memory and configured to:
determine whether a subscriber identification module (SIM) card is a first network SIM card or a second network SIM card;
perform an unlock sequence for personalization based on a subscriber permanent identifier (SUPI) if the SIM card is determined to be the first network SIM card, wherein the unlock sequence comprises:
determine whether the SUPI of the first network SIM card matches with a stored SUPI that is stored in a secure file system (SFS) at the UE; and
initialize the UE to a network if the SUPI of the first network SIM card matches with the stored SUPI that is stored in the SFS at the UE.

24. The apparatus of claim 23, wherein the at least one processor further configured to:
lock based on both a SUPI based personalization scheme and an IMSI based personalization scheme.

25. The apparatus of claim 24, wherein the at least one processor further configured to:
unlock based on one of the SUPI based personalization scheme or the IMSI based personalization scheme.

26. The apparatus of claim 23, wherein performing the unlock sequence based on the SUPI if the UE determines the SIM card is the first network SIM card, the at least one processor further configured to:
generate a hashed control key (HCK) from a given control key (CK);
retrieve a stored HCK from the SFS; and
compare the generated HCK with the stored HCK; and
unlock the UE if the generated HCK matches the stored HCK.

27. The apparatus of claim 23, the at least one processor further configured to:
halt initialization of the UE if the SUPI of the first network SIM card does not match with the stored SUPI that is stored in the SFS.

28. The apparatus of claim 27, the at least one processor further configured to:
display a network unlock personal identification number (PIN) prompt on a display of the UE if the SUPI of the first network SIM card does not match with the stored SUPI that is stored in the SFS.

29. The apparatus of claim 23, the at least one processor further configured to:
perform the unlock sequence for personalization based on an international mobile subscriber identity (IMSI) if the SIM card is determined to be the second network SIM card; and
initialize the UE to the network if the IMSI of the second network SIM card matches the IMSI stored in the SFS.

30. A non-transitory computer-readable medium storing computer executable code, comprising code to:
determine whether a subscriber identification module (SIM) card is a first network SIM card or a second network SIM card;
perform an unlock sequence for personalization based on a subscriber permanent identifier (SUPI) if the SIM card is determined to be a first network SIM card, wherein the unlock sequence comprises:
determine whether the SUPI of the first network SIM card matches with a stored SUPI that is stored in a secure file system (SFS) at the UE; and
initialize the UE to a network if the SUPI of the first network SIM card matches with the stored SUPI that is stored in the SFS at the UE.

* * * * *